United States Patent
Pratt et al.

(10) Patent No.: US 9,985,292 B2
(45) Date of Patent: May 29, 2018

(54) OXYPHOSPHORUS-CONTAINING POLYMERS AS BINDERS FOR BATTERY CATHODES

(71) Applicant: Seeo, Inc, Hayward, CA (US)

(72) Inventors: Russell Clayton Pratt, Foster City, CA (US); Scott Allen Mullin, San Leandro, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 362 days.

(21) Appl. No.: 14/089,617

(22) Filed: Nov. 25, 2013

(65) Prior Publication Data

US 2014/0147752 A1    May 29, 2014

Related U.S. Application Data

(60) Provisional application No. 61/730,497, filed on Nov. 27, 2012.

(51) Int. Cl.
| | |
|---|---|
| *H01M 4/62* | (2006.01) |
| *H01M 4/131* | (2010.01) |
| *H01M 4/136* | (2010.01) |
| *H01M 4/505* | (2010.01) |
| *H01M 4/525* | (2010.01) |

(52) U.S. Cl.
CPC .......... *H01M 4/622* (2013.01); *H01M 4/131* (2013.01); *H01M 4/136* (2013.01); *H01M 4/62* (2013.01); *H01M 4/505* (2013.01); *H01M 4/525* (2013.01); *H01M 2300/0082* (2013.01)

(58) Field of Classification Search
CPC ...... H01M 4/131; H01M 4/136; H01M 4/622; H01M 4/62; H01M 4/505; H01M 2300/0082; H01M 4/525
See application file for complete search history.

(56) References Cited

U.S. PATENT DOCUMENTS

| | | | |
|---|---|---|---|
| 2,382,622 A | 8/1945 | Toy | |
| 4,737,422 A * | 4/1988 | Knight | ................... C08G 65/32 |
| | | | 429/313 |

(Continued)

FOREIGN PATENT DOCUMENTS

| | | |
|---|---|---|
| CN | 101652884 | 2/2010 |
| CN | 102144323 | 8/2011 |

(Continued)

OTHER PUBLICATIONS

Machine English Translation of JP 2006-209995 to Kubota.*

(Continued)

*Primary Examiner* — Michael Dignan
(74) *Attorney, Agent, or Firm* — R'Sue Popowich Caron

(57) ABSTRACT

A class of polymeric phosphorous esters can be used as binders for battery cathodes. Metal salts can be added to the polymers to provide ionic conductivity. The polymeric phosphorous esters can be formulated with other polymers either as mixtures or as copolymers to provide additional desirable properties. Examples of such properties include even higher ionic conductivity and improved mechanical properties. Furthermore, cathodes that include the polymeric phosphorous esters can be assembled with a polymeric electrolyte separator and an anode to form a complete battery.

12 Claims, 1 Drawing Sheet

(56) References Cited

U.S. PATENT DOCUMENTS

| | | | |
|---|---|---|---|
| 4,812,375 A | | 3/1989 | Foster |
| 4,879,190 A | | 11/1989 | Lundsgaard |
| 4,925,751 A | | 5/1990 | Shackle |
| 5,013,619 A | | 5/1991 | Cook |
| 5,354,631 A | | 10/1994 | Chaloner-Gill |
| 5,393,621 A | * | 2/1995 | Chaloner-Gill ......... C07F 9/091 |
| | | | 252/62.2 |
| 5,643,665 A | | 7/1997 | Saidi |
| 5,648,187 A | | 7/1997 | Skotheim |
| 6,025,094 A | | 2/2000 | Visco |
| 6,743,550 B2 | | 6/2004 | Gan |
| 7,026,071 B2 | | 4/2006 | Mayes |
| 7,282,302 B2 | | 10/2007 | Visco |
| 7,318,982 B2 | | 1/2008 | Gozdz |
| 2006/0270822 A1 | | 11/2006 | Norsten |
| 2009/0053603 A1 | | 2/2009 | Hoshiba |
| 2010/0104948 A1 | | 4/2010 | Skotheim |
| 2010/0112441 A1 | | 5/2010 | Fukumine et al. |
| 2011/0003211 A1 | * | 1/2011 | Hudson .................. H01M 4/13 |
| | | | 429/304 |
| 2011/0117432 A1 | | 5/2011 | Kay |

FOREIGN PATENT DOCUMENTS

| | | | | |
|---|---|---|---|---|
| JP | 2006-209995 | * | 8/2006 | ............. H01M 4/62 |
| WO | 2010007543 A1 | | 1/2010 | |

OTHER PUBLICATIONS

Dixon et al. "Non-flammable polyphosphonate electrolytes." Journal of Power Sources 138 (2004) 274-276 published Aug. 2004.*

Dixon et al. "Computational chemistry: design and experimental verification of pre-designed heteropolymer electrolytes for rechargeable lithium batteries." Journal of Power Sources 119-121 (2003) 856-858 published Jun. 2003.*

Penczek et al, "Synthetic Analogues of Phosphorus Containing Biopolymers," Pure & Appi. Chem., vol. 56, No. 10, pp. 1309-1322, 1984.

Abouimrane, et al, "Sodium insertion in carboxylate based materials and their application in 3.6 V full sodium cells," Energy Environ. Sci., 2012, 5, 9632.

Korshak, et al, "Polymerization of Cyclic Alkyl- and Aryl-Phosphonic Esters," Russian Chemical Bulletin (Institute of Heteroorganic Compounds of the Academy of Sciences of the USSR) 1957.

Iwasaki. et al, "Synthesis of Well-Defined Thermoresponsive Polyphosphoester Macroinitiators Using Organocatalysts," Macromolecules 2010, 43, 2664-2666.

Iwasaki, "Synthesis of Well-Defined Thermoresponsive Polyphosphoester Macroinitiators Using Organocatalysts," Macromolecules, vol. 43, 2010, p. 2664.

* cited by examiner

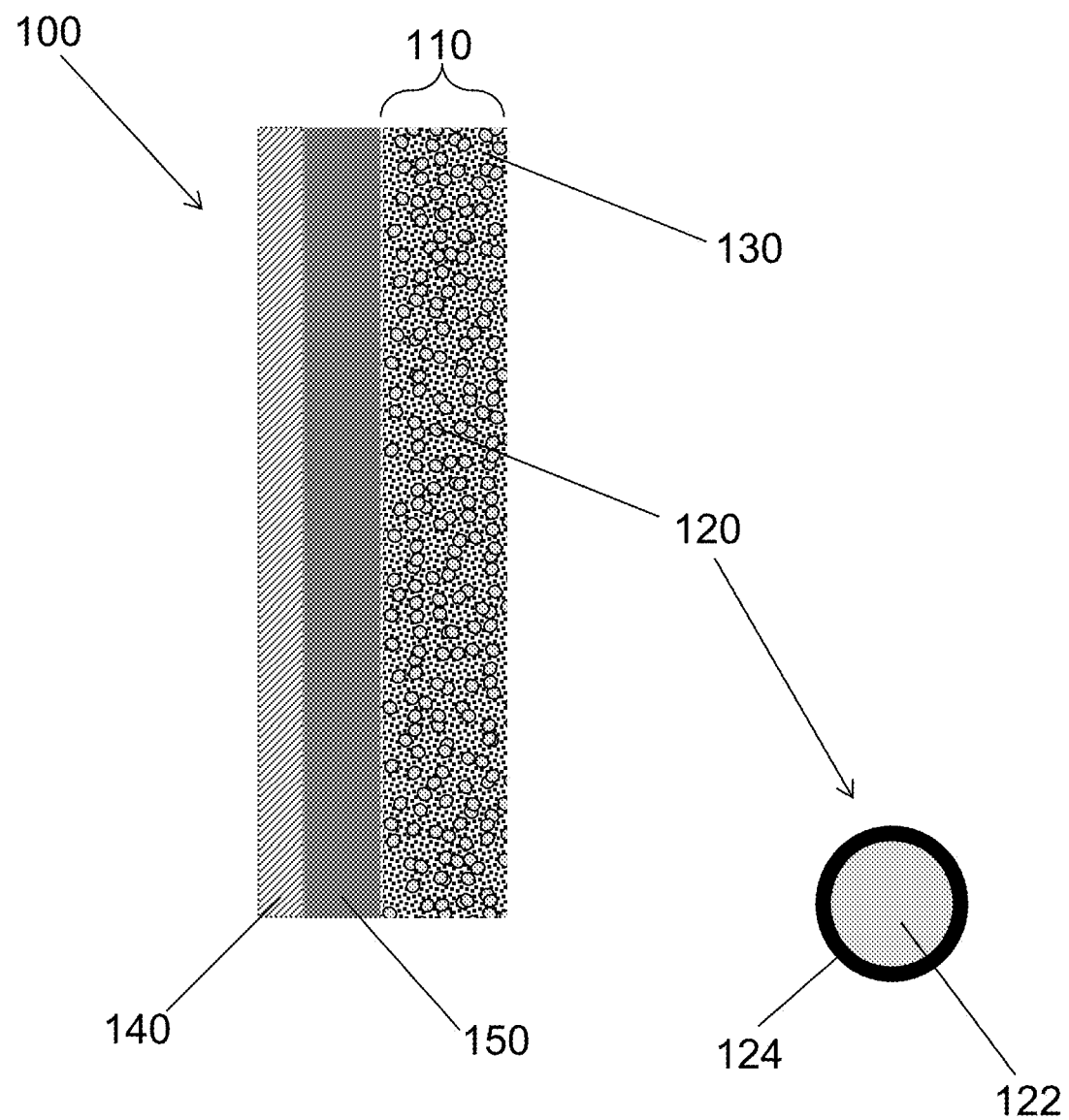

OXYPHOSPHORUS-CONTAINING POLYMERS AS BINDERS FOR BATTERY CATHODES

CROSS-REFERENCE TO RELATED APPLICATIONS

This application claims priority to U.S. Provisional Patent Application 61/730,497, filed Nov. 27, 2012, which is incorporated by reference herein.

STATEMENT OF GOVERNMENT SUPPORT

The invention described and claimed herein was made in part utilizing funds supplied by the U.S. Department of Energy under Contract No. DE-EE0005449. The Government has certain rights in this invention.

BACKGROUND OF THE INVENTION

Field of the Invention

The invention is directed generally to polymer electrolytes for lithium batteries and, more specifically, to new polymer cathode binders that are stable to higher voltages than has been possible with conventional binders used in lithium polymer batteries.

The development of solid state polymer batteries has been dominated by ion-conducting polymer electrolytes made from poly(ethylene oxide) (PEO). Unfortunately, PEO suffers from at least two major drawbacks: 1) its ionic conductivity is highly temperature dependent and 2) its stability under highly oxidizing conditions is low. PEO crystallizes at 60° C., below which point its ionic conductivity is severely reduced. PEO is stable only to about 3.8 V vs $Li^+/Li$, as higher voltages present oxidizing conditions that render it unstable. These two drawbacks limit the overall power and voltage at which batteries that use PEO electrolytes can operate and also limit the temperature range in which such batteries can operate.

It would be useful to find a solution that overcomes these drawbacks so that a Li polymer battery could operate stably at higher voltages without suffering from increased oxidation, thus improving long-term battery stability and increasing battery power.

BRIEF DESCRIPTION OF THE DRAWINGS

The foregoing aspects and others will be readily appreciated by the skilled artisan from the following description of illustrative embodiments when read in conjunction with the accompanying drawing.

FIG. 1 is a schematic drawing of a battery cell, according to an embodiment of the invention.

SUMMARY

A positive electrode is provided. The positive electrode contains positive electrode active material particles that are coated with a material made up of a phosphorus-ester-containing first polymer and a metal salt mixed into the first polymer. The coated positive electrode active material particles are mixed together with an electrolyte to form the positive electrode. An electronically-conductive additive may be mixed together with the coated positive electrode active material particles and the electrolyte. In one arrangement, the coating is configured to bind together the positive electrode active material particles. In one arrangement, the coating also contains a second polymer that can form either a mixture or a block copolymer with the first polymer.

In one embodiment of the invention, the coating and the electrolyte are the same material. In another embodiment of the invention, the coating and the electrolyte are different materials. The electrolyte may contain PEO which may or may not be part of a block copolymer.

In another aspect of the invention, an electrochemical cell is provided. The cell contains a positive electrode with a first electrolyte as described above, a negative electrode, and a second electrolyte to provide ionic communication between the positive electrode and the negative electrode. The first electrolyte and the second electrolyte may or may not be the same material. In one arrangement, the second electrolyte contains PEO which may or may not be part of a block copolymer.

DETAILED DESCRIPTION

The preferred embodiments are illustrated in the context of a lithium battery. The skilled artisan will readily appreciate, however, that the materials and methods disclosed herein will have application in a number of other electrochemical cells where stability at high voltages is important.

These and other objects and advantages of the present invention will become more fully apparent from the following description taken in conjunction with the accompanying drawings.

All publications referred to herein are incorporated by reference in their entirety for all purposes as if fully set forth herein.

In this disclosure, the terms "negative electrode" and "anode" are both used to mean "negative electrode." Likewise, the terms "positive electrode" and "cathode" are both used to mean "positive electrode."

Polymers based on repeating phosphorus esters (referred to herein as PPE for polymeric phosphorous ester) have been explored extensively for a variety of reasons. Phosphate oligomers are used commercially as flame retardants. At a basic research level, they have been used to model the properties of naturally occurring polyphosphates (particularly RNA or DNA) and more recently as biodegradable polymers for biological/medicinal applications. The use of monomeric phosphates such as trimethyl phosphate and triethyl phosphate as additives to liquid electrolytes for lithium ion batteries has been reported in the literature, both for their flame retardant properties and for contributions to stable solid-electrolyte interphase (SEI) layer formation.

Surprisingly, it has been found that polymeric phosphorus esters can also be used to bind together active material particles in cathodes in polymer-based batteries to great advantage. Some of their advantages include the following.

- Due to their polarity, polymeric phosphorus esters that contain a P=O bond can readily dissolve metal salts to provide a path for ionic conduction;
- Polymeric phosphorus esters are generally non-crystalline and amorphous with low glass transition temperatures, so over a wide range of operating temperatures they do not experience a drop in ionic conductivity due to crystallization;
- Polymeric phosphorus esters are highly oxidized (which is what makes them flame retardant), making it is difficult for further oxidization to occur and rendering them very stable at highly oxidizing voltages, for example, at a battery cathode.
- Resistance to oxidation makes phosphate polymers especially useful in and near the cathode of a battery cell, wherein they can provide ionic conductivity while remaining stable against a strong oxidizing voltage. Phosphate polymers are stable to voltages as high as 4V and more. In addition, phosphates may have an affinity for metal oxide surfaces which would be particularly advantageous in providing a substantial layer of phosphate polymer wholly-encompassing the component particles of highly oxidizing cathode materials.

As discussed above, PEO electrolytes are stable only to 3.8V. With stability up to 4V and more, phosphate polymers offer the possibility of operating batteries at a voltage at least 5% higher than is possible today in polymer-based batteries. A 5% increase in voltage results in a 5% increase in both battery power and battery energy, all other things being equal. This is a significant increase in battery performance by historical standards.

Although PPEs are extremely well-suited for use in and around the cathode of a lithium cell, they may not be appropriate for use as an electrolyte throughout an entire lithium battery cell. One drawback is that such polymers are likely to be unstable against the reducing conditions at a lithium metal or lithium ion anode. When PPEs are confined to use at the cathode, they do not experience the reducing conditions at the anode, while still providing the possibility of operating at high potential at (oxidizing conditions at) the cathode. In one arrangement, the PPEs contain no solvent. In another arrangement, the PPEs are not crosslinked.

In one embodiment of the invention, PPEs of interest for use in and near a cathode have the general structure

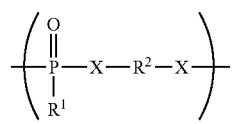

wherein $R^1$ can be hydrogen, hydroxyl, alkyl C1-8, alkenyl C2-C8, alkynyl C2-C8, aryl, alkoxy C1-C8, alkenoxy C4-C8, alkynoxy C4-C8, perfluoroalkoxy C1-C8, aryloxy, alkylthiol C1-C8, arylthiol, alkylamino C1-C8, dialkylamino C1-C8, arylamino, or diarylamino; $R^2$ can be alkyl C2-C8, aryl, or perfluoroalkyl C2-C8; and X can be oxygen, sulfur, or $NR^3$ where $R^3$ can be alkyl C2-C4 or aryl. It may be especially useful to use a hydroxyl for $R^1$, making the P=OH functionality a phosphoric acid, which would be expected to have particularly high affinity for metal oxide surfaces which tend to be basic in character. It is also possible to copolymerize phosphate monomers to create PPEs containing multiple different groups in the R1, R2, and X positions, in either a random or block pattern.

In some embodiments of the invention, PPEs of interest can be synthesized as summarized in Schemes 1 and 2 for ring-opening polymerizations:

Scheme 1

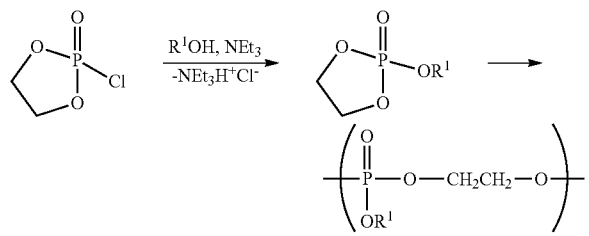

wherein $R^1$=methyl, ethyl, isopropyl, or 2,2,2-trifluoroethyl.

Preparation of PPE (Based on Iwasaki et al., "Synthesis of Well-Defined Thermoresponsive Polyphosphoester Macroinitiators Using Organocatalysts," Macromolecules, 2010, 43, 2664):

A) Monomer preparation. A solution of ethylene chlorophosphate (56.0 g, 0.393 mol) in toluene (520 mL) was prepared and chilled in an icewater bath, and a solution of isopropyl alcohol (24.9 g) and triethylamine (43.4 g) in toluene (200 mL) was added dropwise with stirring. Upon completion of the addition, cooling was removed and the mixture was allowed to warm to room temperature for 1 h. Precipitate was removed by suction filtration and solvent was removed from the filtrate by rotary evaporation. The residue was fractionally distilled under reduced pressure twice, isolating the desired product at 96-105° C. at 0.7 torr as 40.7 g of a clear oil.

B) Polymerization. A solution was made of the monomer (10.0 g), 0.1 M tetraethylene glycol in anisole (1.0 g), and anisole (19.0 g). A solution of triazabicyclodecene (56 mg) in anisole (2.0 g) was added to initiate polymerization. After 30 minutes, this solution was poured into ether (175 mL) containing acetic acid (50 mg) to precipitate the polymer. The solvent was decanted and the residue stirred with fresh ether (100 mL) which was then decanted. Vacuum drying gave the desired polymer as 9.8 g of a clear, viscous mass.

Scheme 2

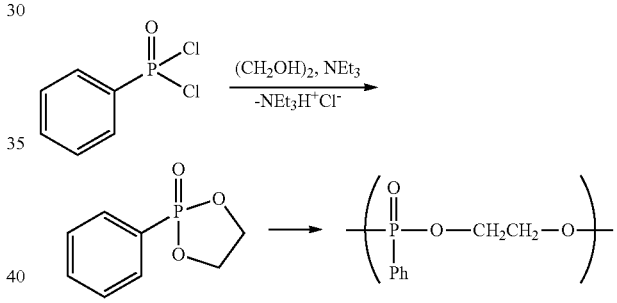

Preparation of PPE (Based on Korshak, et al, "Polymerization of Cyclic Alkyl- and Aryl-Phosphonic Esters," Russ. Chem. Bull. 1957, p. 641-6):

A) Monomer preparation. A solution of ethylene glycol (9.54 g, 0.154 mol) and triethylamine (31.0 g, 0.307 mol) in tetrahydrofuran (200 mL) was prepared and chilled in an icewater bath, and a solution of phenylphosphonic dichloride (30.0 g, 0.154 mol) in tetrahydrofuran (240 mL) was added dropwise with stirring. Upon completion of the addition, cooling was removed and the mixture was allowed to warm to room temperature for 1 h. Precipitate was removed by suction filtration and solvent was removed from the filtrate by rotary evaporation. The residue was redissolved in ethyl acetate (150 mL) and passed through a plug of silica (15 g) and rinsed through with ethyl acetate (100 mL). The fractions were combined and evaporated. The remaining oil was fractionally distilled under reduced pressure twice, isolating the desired product at 142-150° C. at 0.15 torr as 21.7 g of a clear oil. Upon standing the oil spontaneously crystallized to give a white solid identified as ethylene phenylphosphonate.

B) Polymerization. The monomer (10.0 g) was dissolved in anisole (29.0 g). A solution of tetraethylene glycol (19.4 mg) and triazabicyclodecene (13.9 mg) in anisole (1.0 g) was added to initiate polymerization. After 30 seconds, a solution of benzoic acid (24 mg) in anisole (1.0 g) was added to quench polymerization. The reaction solution was poured into ether (200 mL) to precipitate the polymer. The supernatant was decanted. Fresh ether (100 mL) was added and stirred, then decanted. The remaining residue was vacuum dried, leaving the polymer as 9.6 g of a clear, viscous mass.

Additional polymer compositions can be created through condensation polymerization of phenoxyphosphates or chlorophosphates with appropriate alcoholic nucleophiles.

In one embodiment of the invention, PPEs are synthesized as block copolymers with at least one non-phosphorus-containing monomer. In one example, PEO is used as a macroinitiator to form a PEO-PPE block copolymer. In another example hydroxyl-terminated polystyrene (PS-OH) is used as a macroinitiator to form a PS-PPE block copolymer. In other arrangements, the macroinitiator is a hydroxyl-terminated electronically conductive polymer such as a polythiophene, polyvinylphenylene, polyaniline, polypyrrole, polyacetylene, polyphenylene sulfide, poly(3,4-ethylenedioxythiophene) (pedot), or polyfluorenes, which form electronically conductive PPE-based block copolymers.

In another embodiment of the invention, PPEs are synthesized to form a random copolymer with other monomers that contribute additional functionality. Examples of additional functionalities that can be useful include high polarity, suppressed glass transition temperature, single ion conductivity, or specific binding to cathode active material.

In another embodiment of the invention, polymers based on PPEs are combined with a metal salt, $MX_n$, wherein M=Li, Na, or K with n=1; M=Ca, or Mg with n=2, and X=triflate, bis(trifluoromethanesulfonimide) (TFSI), bis(perfluoroethylsulfonylimide) (BETI), $ClO_4$, bis(oxalate-borate) (BOB), $BF_4$, $B(CN)_4$ or $PF_6$ to provide ionic conductivity. It should be understood that although the examples of metal salts provided here are for use in electrochemical cells with lithium chemistry, the polymers described herein are not limited to use with lithium. The polymers disclosed herein can be used with other chemistries through addition of appropriate metal salts. For example, sodium ion insertion batteries with an appropriate anode (such as organic carboxylates) and appropriate cathode (such as hard carbon, or hollow carbon nanowires) could make use of PPEs with salts such as NaTFSI.

In one embodiment of the invention, polymers based on PPEs as described above can act as binding agents when mixed with redox-active, ionically intercalating/deintercalating positive electrode active material particles to form a cathode film. Examples of such positive electrode active materials include but are not limited to lithium iron phosphate (LFP), $LiCoO_2$, $LiMn_2O_4$, lithium nickel cobalt aluminum oxide (NCA), and lithium nickel cobalt manganese oxide (NCM). In another embodiment, polymers based on PPEs are combined with non-intercalating positive electrode active material particles to form a cathode film. Examples of such positive electrode active materials include, but are not limited to, sulfur, microstructured carbon/sulfur composites, lithium peroxides, metal alloys of lithium, and organometallic molecules such as ferrocenes. The cathode films may also include, among others, agents such as carbon black to provide increased electrical conductivity; other polymers such as PEO to provide additional ionic conductivity; or other polymers such as PVDF or PS (polystyrene) to provide improved mechanical strength.

The positive electrode active material can be any of a variety of materials depending on the type of chemistry for which the cell is designed. In one embodiment of the invention, the cell is a lithium or lithium ion cell. The positive electrode active material can be any material that can serve as a host material for lithium ions. Examples of such materials include, but are not limited to materials described by the general formula $Li_xA_{1-y}M_yO_2$, wherein A comprises at least one transition metal selected from the group consisting of Mn, Co, and Ni; M comprises at least one element selected from the group consisting of B, Mg, Ca, Sr, Ba, Ti, V, Cr, Mn, Fe, Co, Ni, Cu, Al, In, Nb, Mo, W, Y, and Rh; x is described by $0.05 \leq x \leq 1.1$; and y is described by $0 \leq y \leq 0.5$. In one arrangement, the positive electrode material is $LiNi_{0.5}Mn_{0.5}O_2$.

In one arrangement, the positive electrode active material is described by the general formula: $Li_xMn_{2-y}M_yO_2$, where M is chosen from Mn, Ni, Co, and/or Cr; x is described by $0.05 \leq x \leq 1.1$; and y is described by $0 \leq y \leq 2$. In another arrangement, the positive electrode active material is described by the general formula: $Li_xM_yMn_{4-y}O_8$, where M is chosen from Fe and/or Co; x is described by $0.05 \leq x \leq 2$; and y is described by $0 \leq y \leq 4$. In another arrangement, the positive electrode active material is given by the general formula $Li_x(Fe_yM_{1-y})PO_4$, where M is chosen from transition metals such as Mn, Co and/or Ni; x is described by $0.9 \leq x \leq 1.1$; and y is described by $0 \leq y \leq 1$. In yet another arrangement, the positive electrode active material is given by the general formula: $Li(Ni_{0.5-x}Co_{0.5-x}M_{2x})O_2$, where M is chosen from Al, Mg, Mn, and/or Ti; and x is described by $0 \leq x \leq 0.2$. In some arrangements, the positive electrode material includes $LiNiVO_2$.

In one embodiment of the invention, the positive electrode active material particles can be made of one or more of the following: lithium iron phosphate (LFP), $LiCoO_2$, $LiMn_2O_4$, lithium nickel cobalt aluminum oxide (NCA), and lithium nickel cobalt manganese oxide (NCM).

In another embodiment of the invention, the positive electrode active material particles can be made of one or more of the following: sulfur, microstructured carbon/sulfur composites, lithium peroxides, metal alloys of lithium, and organometallic molecules.

In one embodiment of the invention, a cathode 110 that contains active material particles and polymer binders based on PPEs can be assembled such that the PPE binder forms a thin coating on the surface of the active particles, as shown in the schematic drawing of a battery cell 100 in FIG. 1. The cathode 110 contains positive electrode material particles 120. The particles 120 contain positive electrode material 122 coated with a PPE binder 124. The coating layer 124 is oxidatively stable to the potential at which the cathode operates. In some arrangements, a first electrolyte 130 can be used to provide ionic communication between a second electrolyte 150 and the cathode active particles 120. The first electrolyte 130 may also act as a binder between the active particles 120. The first electrolyte 130 may have other desirable properties such as higher ionic conductivity than the coating layer 124 or improved binding properties to maintain structural integrity of the cathode composite. In one arrangement (not shown), binders such as PVDF (polyvinylidene fluoride) can be used to ensure cohesiveness among the PPE-coated positive electrode active material particles. In one arrangement, the coating layer 124 and the first electrolyte 130 are the same material. The cell 100 also has an anode 140 adjacent to the second electrolyte 150.

In one embodiment of the invention, a cathode that contains active material and polymers based on PPEs can be assembled with an anode, separated by an electrolyte, to form a battery. When a PEO-based electrolyte is used in the separator between the anode and the cathode, it can be useful to include some PEO in the cathode to improve interfacial ionic transfer between the cathode and the electrolyte. In one arrangement, PEO is added to the cathode through intimate mixing with other cathode components. In another arrangement, PEO is added to the cathode in the form of a PEO-PPE block copolymer. In yet another arrangement, PEO or a PEO-PPE block copolymer is used as an intermediate layer between the cathode and the electrolyte. Other electrolytes commonly-used as the separator include, but are not limited to, PS-PPE block copolymers. In another arrangement electronically conductive block copolymers based on PPE are added to the cathode. Examples include, but are not limited to, block copolymers of PPE and electronically conductive polymers such as polythiophene, polyvinylphenylene, polyaniline, polypyrrole, polyacetylene, polyphenylene sulfide, poly(3,4-ethylenedioxythiophene) (pedot), or polyfluorenes. Again it is useful if at least some of the ionic conductor from the separator is incorporated into the cathode as described above or is used to form an intermediate layer between the cathode and the electrolyte.

In one embodiment the PPEs may be fluorinated or perfluorinated. Fluorine can be introduced to the PPE structure through the $R^1$ and $R^2$ groups depicted in the structures above. Fluorinated polymers may have different electrolyte properties, which may include better high-voltage stability, and higher conductivity by means of altering the polymer/salt interactions and depressing the polymer glass transition temperature. Nafion is an example of a common, perfluorinated polymer electrolyte. Fluorinated electrolytes are typically unstable to the reducing potentials at the lithium anode, but in the case of a cathode binder stability at the anode is not a problem since the electrolyte-binder is physically isolated from the anode.

The negative electrode active material can be any of a variety of materials depending on the type of chemistry for which the cell is designed. In one embodiment of the invention, the cell is a lithium or lithium ion cell. The negative electrode material can be any material that can serve as a host material (i.e., can absorb and release) lithium ions. Examples of such materials include, but are not limited to graphite, lithium metal, and lithium alloys such as Li—Al, Li—Si, Li—Sn, and Li—Mg. Silicon and silicon alloys are known to be useful as negative electrode materials in lithium cells. Examples include silicon alloys of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) and mixtures thereof. In some arrangements, graphite, metal oxides, silicon oxides or silicon carbides can also be used as negative electrode materials.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrochemical cell, comprising:
a positive electrode, comprising:
coated positive electrode active material particles, comprising:
positive electrode active material particles; and
a coating on the positive electrode active material particles, the coating comprising:
a phosphorus-ester-containing first polymer that has the following structure:

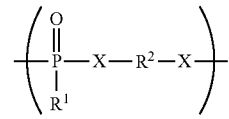

wherein $R^1$ is selected from the group consisting of hydrogen, hydroxyl, alkyl C1-C8, alkenyl C2-C8, alkynyl C2-C8, aryl, alkoxy C1-C8, alkenoxy C4-C8, alkynoxy C4-C8, perfluoroalkoxy C1-C8, aryloxy, alkylthiol C1-C8, arylthiol, alkylamino C1-C8, dialkylamino C1-C8, arylamino, and diarylamino;

$R^2$ is selected from the group consisting of alkyl C2-C8, aryl, and perfluoroalkyl C2-C8; and X is selected from the group consisting of oxygen, sulfur, and $NR^3$;
wherein $R^3$ is selected from the group consisting of alkyl C2-C4 and aryl; and a metal salt mixed into the first polymer; and an electrolyte comprising PEO mixed together with the coated positive electrode active material particles, the electrolyte acting as a binder between the coated positive electrode active material particles;

wherein the coating and the electrolyte comprise different materials; and wherein the cathode is assembled with the coated positive electrode active material particles before the cathode is further assembled with an anode and a separator electrolyte to form a battery.

2. The electrode of claim 1 wherein the positive electrode active material particles comprise one or more materials selected from the group consisting of lithium iron phosphate (LFP), $LiCoO_2$, $LiMn_2O_4$, lithium nickel cobalt aluminum oxide (NCA), and lithium nickel cobalt manganese oxide (NCM).

3. The electrode of claim 1 wherein the coating contains no solvent.

4. The electrode of claim 1 wherein the coating is not cross linked.

5. The electrode of claim 1, further comprising a second polymer added to the coating.

6. The electrode of claim 5, wherein the first polymer and the second polymer form a mixture.

7. The electrode of claim 5, wherein the first polymer and the second polymer form a block copolymer.

8. The electrode of claim 1, further comprising an additional binder material to bind together the positive electrode active material particles.

9. The electrode of claim 1 wherein the metal salt is selected from the group consisting of salts of the form $MX_n$, wherein M=Li, Na, or K with n=1; M=Ca, or Mg with n=2, and X=triflate, bis(trifluoromethanesulfonimide) (TFSI), bis (perfluoroethylsulfonylimide) (BETI), $ClO_4$, bis(oxalate-borate) (BOB), $BF_4$, $B(CN)_4$, and $PF_6$.

10. The electrode of claim 1, further comprising an electronically-conductive additive mixed together with the coated positive electrode active material particles and the electrolyte.

11. The electrode of claim 1, wherein the electrolyte comprises a block copolymer.

12. The electrode of claim 1 wherein the coating wholly encompasses the positive electrode active material particles.

* * * * *